United States Patent
Lewis et al.

(10) Patent No.: US 11,687,103 B2
(45) Date of Patent: Jun. 27, 2023

(54) CHEMICAL CONTROLLER SYSTEM AND METHOD

(71) Applicant: PENTAIR WATER POOL AND SPA, INC., Cary, NC (US)

(72) Inventors: Keith Lewis, Moorpark, CA (US); Greg Lyons, Ojai, CA (US)

(73) Assignee: PENTAIR WATER POOL AND SPA, INC., Cary, NC (US)

( * ) Notice: Subject to any disclaimer, the term of this patent is extended or adjusted under 35 U.S.C. 154(b) by 107 days.

(21) Appl. No.: 17/302,218

(22) Filed: Apr. 27, 2021

(65) Prior Publication Data

US 2021/0247785 A1 Aug. 12, 2021

Related U.S. Application Data

(60) Division of application No. 16/259,076, filed on Jan. 28, 2019, now Pat. No. 10,990,115, which is a continuation of application No. 15/061,047, filed on Mar. 4, 2016, now Pat. No. 10,191,498.

(60) Provisional application No. 62/128,796, filed on Mar. 5, 2015.

(51) Int. Cl.
| | |
|---|---|
| *G05D 21/02* | (2006.01) |
| *C02F 1/00* | (2023.01) |
| *C02F 1/68* | (2023.01) |
| *C02F 1/50* | (2023.01) |
| *C02F 1/66* | (2023.01) |
| *C02F 1/74* | (2023.01) |
| *C02F 1/76* | (2023.01) |
| *C02F 103/42* | (2006.01) |

(52) U.S. Cl.
CPC ............. *G05D 21/02* (2013.01); *C02F 1/008* (2013.01); *C02F 1/685* (2013.01); *C02F 1/50* (2013.01); *C02F 1/66* (2013.01); *C02F 1/74* (2013.01); *C02F 1/76* (2013.01); *C02F 2103/42* (2013.01); *C02F 2209/006* (2013.01); *C02F 2209/008* (2013.01); *C02F 2209/06* (2013.01); *C02F 2209/07* (2013.01)

(58) Field of Classification Search
None
See application file for complete search history.

(56) References Cited

U.S. PATENT DOCUMENTS

| | | |
|---|---|---|
| 3,643,102 A | 2/1972 | Harper |
| 4,016,079 A | 4/1977 | Severin |
| 4,033,871 A | 7/1977 | Wall |
| 4,224,154 A | 9/1980 | Steininger |
| 4,519,914 A | 5/1985 | Etani |
| 4,530,120 A | 7/1985 | Etani |
| 4,648,043 A | 3/1987 | OLeary |
| 4,767,511 A | 8/1988 | Aragon |

(Continued)

*Primary Examiner* — Richard C Gurtowski
(74) *Attorney, Agent, or Firm* — Husch Blackwell LLP

(57) ABSTRACT

A method of controlling an output relay of a chemical controller is disclosed. The output relay is coupled to a pump configured to introduce at least one chemical into the aquatic application. The chemical controller controls the operation of the pump using the output relay. The method includes the step of utilizing a watchdog timer circuit to determine that a processor has failed to send a reset signal to the watchdog timer circuit before a timer of the watchdog timer circuit reaches zero. The method further includes the step of outputting a processor fault signal from the watchdog timer circuit.

20 Claims, 8 Drawing Sheets

(56) References Cited

U.S. PATENT DOCUMENTS

| | | | |
|---|---|---|---|
| 5,422,014 | A | 6/1995 | Allen et al. |
| 5,849,199 | A | 12/1998 | Jack |
| 6,309,538 | B1 | 10/2001 | Khan |
| 6,340,431 | B2 | 1/2002 | Khan |
| 6,407,469 | B1 | 6/2002 | Cline et al. |
| 6,643,108 | B2 | 11/2003 | Cline et al. |
| 6,676,831 | B2 | 1/2004 | Wolfe |
| 6,747,367 | B2 | 6/2004 | Cline et al. |
| 7,417,834 | B2 | 8/2008 | Cline et al. |
| 7,626,789 | B2 | 12/2009 | Cline et al. |
| 7,854,597 | B2 | 12/2010 | Stiles, Jr. et al. |
| 7,859,813 | B2 | 12/2010 | Cline et al. |
| 8,043,070 | B2 | 10/2011 | Stiles, Jr. et al. |
| 8,209,794 | B1 | 7/2012 | Harrison |
| 8,281,647 | B2 | 10/2012 | Boutet et al. |
| 8,404,117 | B1 | 3/2013 | Steinbrueck et al. |
| 10,191,498 | B2 | 1/2019 | Lewis et al. |
| 10,990,115 | B2 * | 4/2021 | Lewis .................... G05D 21/02 |
| 2006/0146462 | A1 | 7/2006 | McMillian |
| 2016/0032703 | A1 * | 2/2016 | Broussard ............... E21B 43/26 166/250.01 |

* cited by examiner

CHEMICAL CONTROLLER SYSTEM AND METHOD

CROSS REFERENCE TO RELATED APPLICATION

This application is a division of U.S. patent application Ser. No. 16/259,076, filed Jan. 28, 2019, which is a continuation of U.S. patent application Ser. No. 15/061,047, filed Mar. 4, 2016, which claims priority to U.S. Provisional Patent Application No. 62/128,796, filed Mar. 5, 2015, the entire contents of which are hereby incorporated by reference.

BACKGROUND

Many aquatic applications require monitoring of levels of certain chemicals within the water. Alternatively, chemical characteristics of the water associated with certain chemicals may require monitoring (e.g., pH levels, alkalinity, etc.). In some instances, chemicals may be automatically added to the water with an automated chemical delivery system, in part, in response to detected chemical levels or water chemical characteristics determined as part of the monitoring process. For example, in a pool or spa setting, an amount of chlorine may be monitored and additional chlorine may be added if the detected level is too low.

In some applications, chemicals are added to an aquatic application manually. In other applications, chemicals are automatically added to the body of water via one or more pumps or similar devices. The pumps may be integrated with, or controlled by, a separate chemical controller. Though suitable for many applications, known chemical controllers may not meet the needs of all users, application settings, or configurations. For example, in some situations, a chemical controller may malfunction and inadvertently continuously run, thereby creating a non-ideal water characteristic situation.

Certain chemical controllers or aquatic application systems may include fail-safe mechanisms to prevent such situations from occurring. For example, a system may sense the characteristics of the water and attempt to correct non-ideal characteristics or create a fault to cease operation of the chemical controller via mechanical means and/or through system logic if such corrective measures are not effective. However, no known system addresses this particular issue at its root cause of improperly functioning relays and related circuitry. By addressing the issue at the root cause, non-ideal water characteristic situations can be avoided or more quickly addressed. With an automated chemical delivery system, it may be desirable to include additional failsafe mechanisms as part of the chemical controller.

SUMMARY OF THE INVENTION

Some embodiments include a chemical controller for an aquatic application. The chemical controller may include an output relay coupled to a pump, a current fault detection device, a relay drive circuit, and a switching mechanism. The pump may be configured to introduce at least one chemical into the aquatic application. The chemical controller may be designed to control the operation of the pump using the output relay. The current fault detection device may be configured to output a current fault signal indicative of an occurrence of a current fault condition. The current fault condition may include a condition where a current exists on the output of the output relay while the output relay is instructed to be deactivated via a corresponding relay enable signal. The relay drive circuit may be configured to activate and deactivate the output relay via the relay enable signal. The switching mechanism may be coupled between the current fault detection device and the relay drive circuit. The switching mechanism may be designed to control the relay drive circuit based on the current fault signal. The chemical controller may include an output power shutoff relay configured to remove an output power provided to the output relay when the current fault signal indicates the occurrence of the current fault condition. The aquatic application may be at least one of a pool, a hot tub, a spa tub, a fountain, a pond, or a recirculating aquaculture system. The chemical controller may be in communication with a sensor. The sensor may be configured to sense one or more characteristics of the aquatic application. The one or more characteristics may include pH values and alkalinity values. The chemical controller may control the pump to deliver the at least one chemical based on the sensed one or more characteristics of the aquatic application. The switching mechanism may include a relay latch.

In accordance with another embodiment, a method of controlling an output relay of a chemical controller is disclosed. The output relay may be coupled to a pump. The pump may be configured to introduce at least one chemical into the aquatic application. The chemical controller may control the operation of the pump using the output relay. The method may include the step of utilizing a watchdog timer circuit to determine that a processor has failed to send a reset signal to the watchdog timer circuit before a timer of the watchdog timer circuit reaches zero. The method may further include the step of outputting a processor fault signal from the watchdog timer circuit. The method may further include the step of decoupling a relay enable signal from a corresponding relay latch output based on the processor fault signal. The method may further include the step of transmitting a signal to a relay drive circuit from the corresponding relay latch output. The relay drive circuit may be configured to activate and deactivate the output relay based on the received signal. The processor fault signal may be indicative of an occurrence of a hung processor. The method may further comprise the step of removing an output power provided to the output relay when the processor fault signal indicates the occurrence of the hung processor. The output power to the output relay may be removed by deactivating a master power relay.

In accordance with another embodiment, a method of controlling an output relay of a chemical controller is disclosed. The output relay may be coupled to a pump. The pump may be configured to introduce at least one chemical into the aquatic application. The chemical controller may control the operation of the pump using the output relay. The method may include the step of utilizing a watchdog timer circuit to determine that a processor has failed to send a reset signal to the watchdog timer circuit before a timer of the watchdog timer circuit reaches zero. The method may further include the step of outputting a processor fault signal from the watchdog timer circuit. The method may further include controlling, by a relay drive circuit, an output power master relay based on the processor fault signal, the output power master relay providing output power to the output relay. The method may further include deactivating the output power master relay thereby disconnecting the output power to the output relay.

In accordance with yet another embodiment, a chemical control system for an aquatic application is disclosed. The chemical controller system may include a pump configured to introduce at least one chemical into the aquatic application, a chemical controller designed to regulate a chemical parameter of the aquatic application by controlling operation of the pump via an output relay, and an output relay monitoring circuit. The output relay monitoring circuit may include a current detection circuit configured to detect a current on an output of the output relay. The output relay monitoring circuit may include a current fault detection device configured to output a current fault signal when current exists on the output of the output relay while the output relay is instructed to be deactivated via a corresponding relay enable signal. The output relay monitoring circuit may include an output power shutoff relay configured to selectively disconnect supply power from the output relay. The output relay monitoring circuit may include a first relay drive circuit that is coupled between the output power shutoff relay and the current fault detection device, the first relay drive circuit being designed to output a signal that causes the output power shutoff relay to disconnect supply power from the output relay based on the current fault signal. The output relay monitoring circuit may include a relay latch circuit configured to decouple the relay enable signal from a corresponding relay latch output based on the current fault signal. The output relay monitoring circuit may include a relay drive circuit. The relay drive circuit deactivating the output relay when the relay enable signal is decoupled. The chemical control system may include a processor that outputs the relay enable signal. The chemical control system may include a watchdog timer circuit configured to receive a reset signal from the processor and to output a processor fault signal that indicates that the processor is hung when the watchdog timer circuit has not received the reset signal from the processor prior to a timer of the watchdog timer circuit reaching zero. The chemical control system may include a logic gate that receives the processor fault signal from the watchdog timer circuit, receives the current fault signal from the current fault detection device, and produces a logic output, the first relay drive circuit being designed to receive the logic output from the logic gate. The current fault detection device may include a logic gate that receives the relay enable signal from the processor, that receives a current detection signal from the current detection circuit, and that produces a logic output. The current fault detection device may include a current fault latch that receives the logic output from the logic gate and that produces the current fault signal. The chemical controller may include a user interface that is configured to allow a user to input chemical parameters associated with the aquatic application. The controller may include a display. The chemical controller may be in communication with a sensor. The sensor may be configured to sense one or more chemical characteristics of the aquatic application. The pump may be a peristaltic pump.

DETAILED DESCRIPTION

Figure 1:
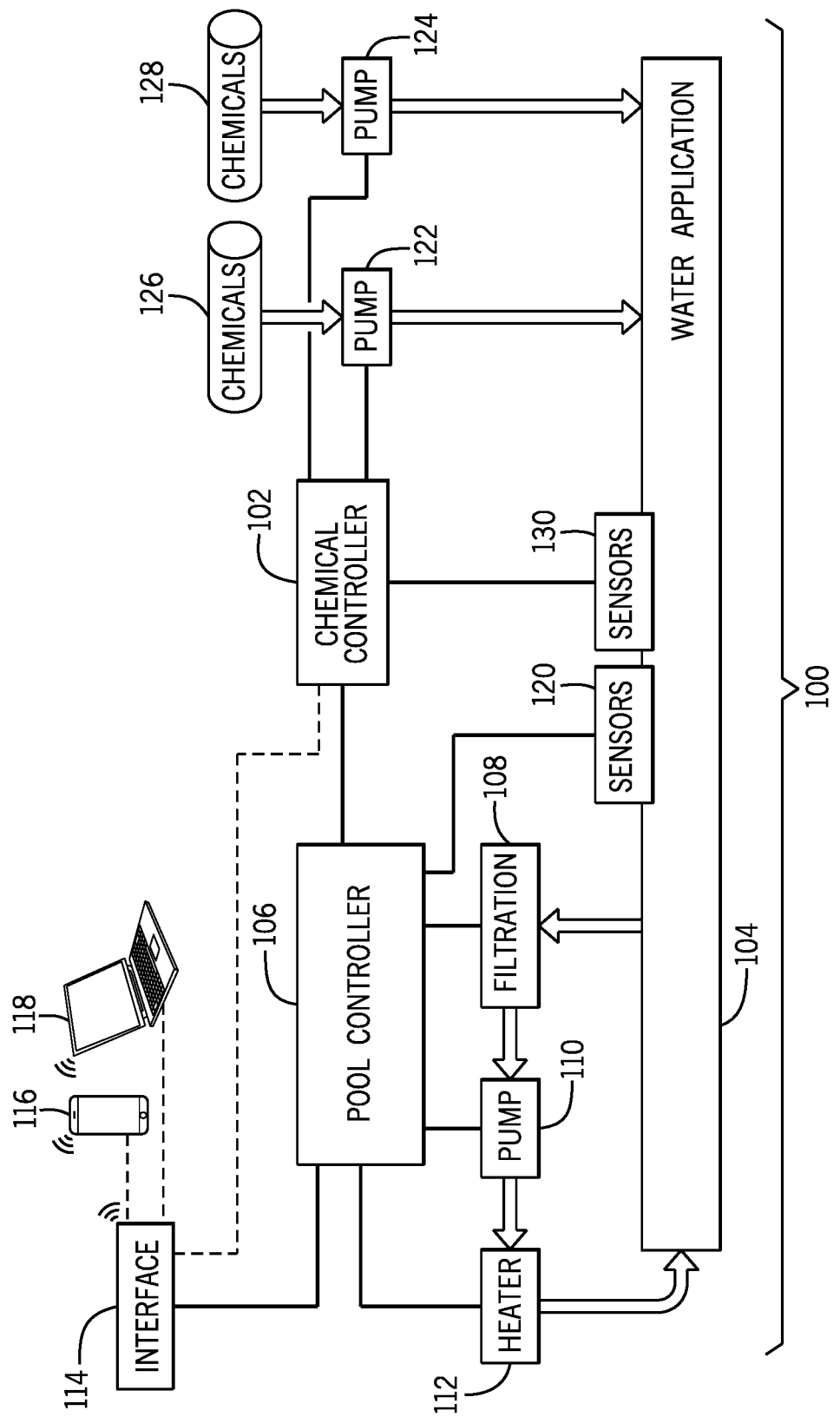
FIG. 1 is an schematic of an example contextual setting for a chemical controller in accordance with various embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Aquatic applications include water that is contained within a structure, whereby the water is defined by a specific chemical composition suitable to the specific aquatic application. In some instances, it may be desirable to keep water that is present within the aquatic application at a specified level with respect to its chemical makeup and other associated parameters. To initially set up and/or maintain the water at the specified levels, a controller is configured to automatically add one or more chemicals to the water via a pump to effectuate a change in the chemical composition of the water. The chemicals may be periodically or continuously monitored and adjusted as the chemical composition of the water changes. In some instances, the controller is configured to inhibit the addition of chemicals once the chemical composition reaches a certain threshold. If the threshold is breached, or if the controller does not terminate the addition of chemicals in an expected manner, the controller may include a safety circuit that can detect a fault condition and disable the controller, which inhibits the flow of additional chemicals into the aquatic application.

FIG. 1 illustrates an example setting 100 for a chemical controller 102. The chemical controller 102 is generally used in conjunction with one or more aquatic applications 104, for example, a pool, a hot tub, a spa tub, a fountain, or any other fluid application where regulation of one or more chemicals may be beneficial. The chemical controller 102 may be in communication with a primary controller 106 that communicates with or otherwise operates other devices controlling aspects of the aquatic application 104. For example, the primary controller 106 may be in communication with and/or control one or more of a filtration device 108, a central water pump 110, a heater 112, and/or any number of other devices and systems used with the aquatic application 104. The primary controller 106 may include an integral or separate control interface 114 to enable control of the system by a user and/or to provide data (e.g., status, temperatures, settings, levels, etc.) to the user. In certain embodiments, the interface 114 may also communicate directly with the chemical controller 102. In other embodiments, the chemical controller 102 may communicate with the primary controller 106 instead, wherein instructions may be relayed through the primary controller 106 to or from the interface 114. In some embodiments, the interface 114 can provide a touch-screen interface, allowing a user to touch the display to perform the desired commands.

In some embodiments, the interface 114 may be capable of providing, communicating with, or be incorporated into other user interfaces via other user devices, such as a smart phone 116, a computer 118, a tablet device (not shown), or other user devices. Such communication may be effected through one or more wired connections or via a wireless connection, either directly to the primary controller 106 or through one or more remote servers providing an online control service. In certain embodiments, communication may similarly be effected between the user devices (e.g., smart phone 116 or computer 118) and the chemical controller 102. The primary controller 106 may also optionally include one or more sensors 120 that are coupled to the aquatic application 104 or other devices within the system to provide feedback regarding the status of the aquatic application 104 or any of the devices within the system. For example, the sensors 120 may include one or more of a temperature sensor, a flow rate sensor, a pressure sensor, and other sensors.

In some embodiments, the chemical controller 102 may be coupled to one or more chemical distribution mechanisms provided in the form of one or more pumps 122, 124. The pumps 122, 124 are in communication with and designed to deposit one or more chemicals 126, 128 into the aquatic application 104. The pumps may be, for example, peristaltic pumps, though many various types of pumps may be suitable, including rotary pumps, reciprocating pumps, gear pumps, screw pumps, progressing cavity pumps, roots-type pumps, plunger pumps, triplex-style pumps, compressed-air-powered pumps, diaphragm pumps, rope pumps, flexible impeller pumps, hydraulic ram pumps, velocity pumps, gravity pumps, steam pumps, or other pumps. In one embodiment, the pumps 122, 124 are separate from the chemical controller 102. Alternatively, the pumps 122, 124 can be integral to the chemical controller 102. In operation, the pumps 122, 124 are in fluid communication with various chemicals 126, 128 (e.g., in liquid or dissolved form) and the pumps 122, 124 may control pumping of the chemicals 126, 128 into the aquatic application 104. The chemical controller 102 can also control other system components including carbon dioxide dispensing systems and salt chlorine generators (for example, the IntelliChlor® system provided by Pentair®).

Example chemicals that may be used to adjust the water chemistry of the aquatic application 104 include pH increasers (e.g., sodium carbonate, soda ash, etc.), pH decreasers (e.g., sodium bisulfate, etc.), alkalinity increasers (e.g., sodium bicarbonate, baking soda, etc.), alkalinity decreasers (e.g., muriatic acid, sodium bisulfate, etc.), sanitizers (e.g., chlorine, bromine, biguanide, ionization, etc.), algaecides (e.g., quaternary ammonia, polyquats, metallic, borates, bromine salts, etc.), shocks and oxidizers (e.g., sodium di-clor, calcium-hypochlorite, lithium hypochlorite, sodium hypochlorite, non-chlorine oxidizers, etc.) as well as other pool, spa, aquaculture, and other water chemicals. In some embodiments, pH control of the aquatic application 104 may be manipulated by injecting a gas (e.g., carbon dioxide) via a regulator into the water. In some embodiments, a chemical may be added to the water via the pump 122 and the aquatic application 104 may further add a gas into the water via injection.

The chemical controller 102 may also include one or more secondary sensors 130 that are in contact with the water of the aquatic application 104 to detect various levels of chemicals within the aquatic application 104 and/or to sense chemical attributes (e.g., pH, alkalinity, etc.) of the water within the aquatic application 104. Other secondary sensors 130, such as temperature sensors can be used to provide water temperature information to the chemical controller to allow for possible pH adjustments related to temperature. Further, other secondary sensors 130, such as pressure sensors, flow sensors, and the like can also be in communication with the chemical controller 102. However, in some embodiments, such sensing operations may be performed by the primary controller 106 via one or more of its sensors 120.

In some embodiments, one or more sensors 120 of the primary controller 106 work in conjunction with the secondary sensors 130 of the chemical controller 102 to provide operational data about the aquatic application 104. In other embodiments, the sensors 120 of the primary controller 106 act to provide sensing capabilities exclusively without the use of any of the secondary sensors 130. In a further embodiment, the secondary sensors 130 of the chemical controller 102 act to provide sensing capabilities exclusively without the use of any of the sensors 120 of the primary controller 106.

In certain embodiments, the primary controller 106 is in communication with and controls operations of the chemical controller 102. This may be, for example, at a high-level of control (e.g., the primary controller 106 granting the chemical controller 102 permission to operate as the chemical controller 102 decides as needed) or at a very precise level of control (e.g., the primary controller 106 instructing the chemical controller 102 to deposit a specific amount (e.g., 100 mL) of a specific chemical (e.g., chlorine) into the aquatic application 104). In other embodiments, the primary controller 106 and the chemical controller 102 share controlling responsibilities. For example, during normal conditions, the primary controller 106 may communicate to the chemical controller 102 times during which it may operate (as needed or with specific operations). However, if a chemical condition is determined that requires attention (e.g., pH levels outside of an acceptable range, etc.), the chemical controller 102 may notify the primary controller 106 so that the primary controller 106 may cease or effect operation of various devices according to the needs of the chemical controller 102. In other examples still, the primary controller 106 and the chemical controller 102 may comprise a single master device.

In some configurations, the chemical controller 102 may operate as a standalone device or as a device that operates relatively (or completely) independent from the primary controller 106. For example, the chemical controller 102 may only report information to the primary controller 106. In some approaches, the automation and/or programming of the chemical controller 102 may have a limited amount of settings that can be altered. For example, in certain configurations, the chemical controller 102 may induce a feed (i.e., introduce chemicals into the aquatic application 104) by adjusting the chemical set point. In other configurations, for example, the chemical controller 102 may be provided as a standalone unit, operating independent of other controllers (e.g., the primary controller 106). In still other embodiments, the chemical controller 102 may operate in conjunction with controllers associated with other system devices. For example, in some embodiments, the chemical controller 102 may be configured to also control the heater 112, to read pump flow rates, and to perform other functions and control described above with respect to the primary controller 106.

Figure 8:
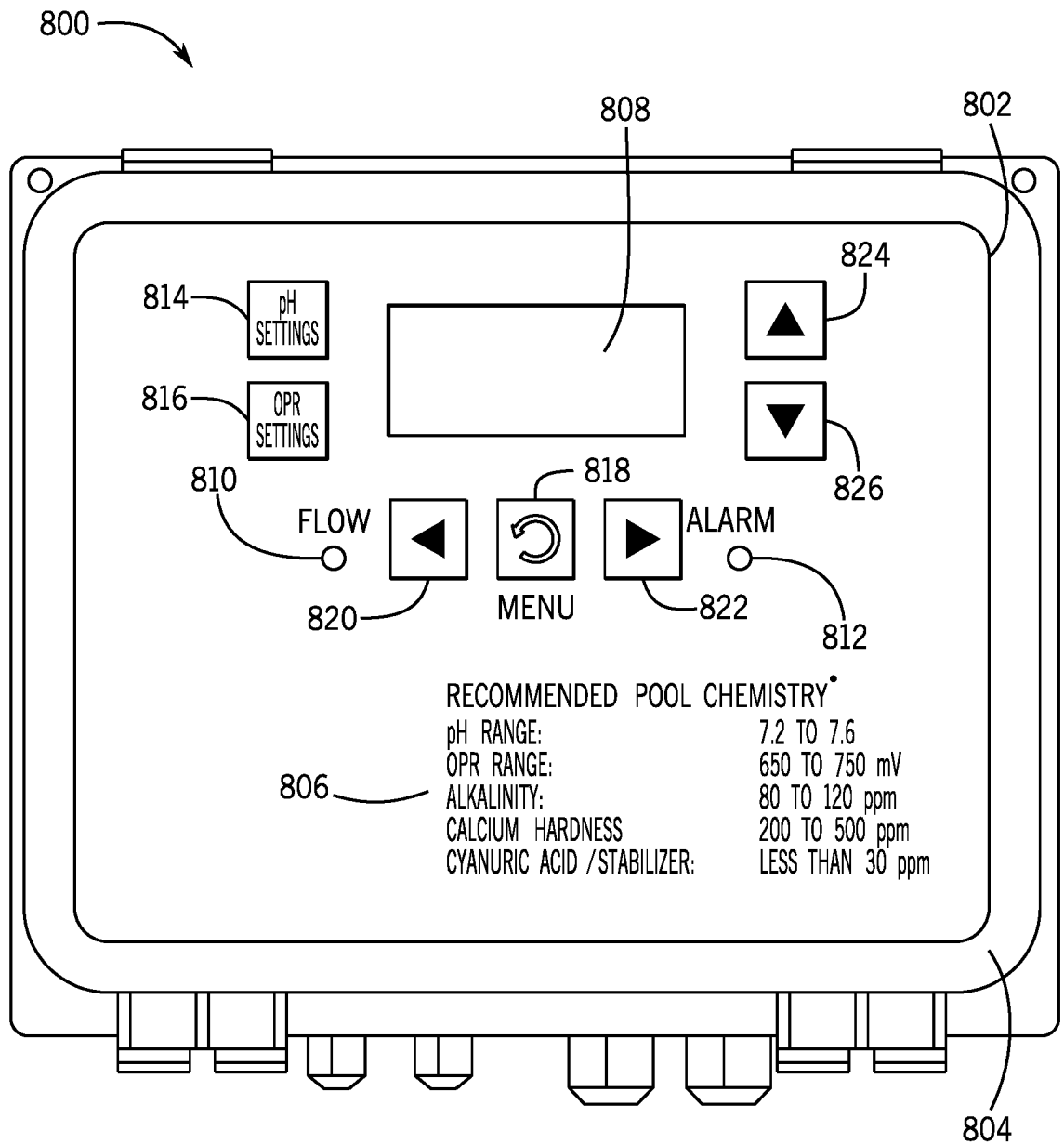
FIG. 8 is a front elevational view of a chemical controller designed to be used with the safety circuit of FIG. 2.

Further, in some embodiments, the chemical controller 102 may be capable of controlling multiple independent bodies of water. For example, the chemical controller 102 may be capable of controlling multiple bodies of water (e.g., pools, spas, recirculating aquaculture systems) at the same time. In one embodiment, the chemical controller 102 can control a first body of water (e.g., a spa) and a second body of water (e.g., a swimming pool) simultaneously. In typical configurations, spas contain substantially less water than a pool and may have different water chemistry parameters. For example, a pool may contain 20,000 gallons of water, while a spa may have a capacity of only about 500 gallons of water. Thus, the chemical levels (e.g., pH levels, Oxygen Reduction Potential ("ORP") values, etc.) in a spa may respond much more rapidly to the introduction of chemicals than the chemical levels in a pool or a larger body of water. Further, the temperature of the water in a spa is generally much higher than the temperature of a pool, requiring additional regulation calculations to account for effects of higher temperatures on chemical levels. Due to the variations in temperature, the chemical controller 102 therefore is provided information about which body of water to be regulated at a given point in time to properly control the chemical levels. In one embodiment, the chemical controller 102 may rely on the secondary sensors 130 to constantly monitor changes to the chemical levels of the body of water. If the rates of change of the chemical levels exceed predetermined values or specified thresholds, the chemical controller 102 may determine that it is currently regulating a spa. In some embodiments, the predetermined values may be default values that are preprogrammed into the chemical controller 102 prior to use. Alternatively, the predetermined values may be set by a user manually. For example, a user may set the predetermined values via a user interface, as shown in FIG. 8, discussed below. Furthermore, the secondary sensors 130, such as pressure or flow sensors, can be connected to an outlet of the spa to detect if flow is being directed to the spa. Further, in some examples, the secondary sensors 130 include pressure and/or flow sensors in both an output to the spa and an output to the pool. The secondary sensors 130 can then provide data indicating which body of water is currently receiving flow.

The chemical controller 102 may regulate the feed of chemicals into the body of water after having determined what type of body of water it is regulating. In some examples, the chemical controller can control the pumps 122, 124 associated with the chemicals 126, 128 to properly regulate the chemicals 126, 128 being dispersed into the body of water. Further, in some examples, the chemical controller 102 and the primary controller 106 can be in communication via a heartbeat signal. The heartbeat signal can indicate which body of water is currently active. For example, the primary controller 106 may provide an indication to the chemical controller 102 that the spa is currently active (i.e., water is being pumped and filtered to the spa via the pump 110 and the filtration device 108.) The chemical controller 102 can then regulate the chemical levels of that body of water accordingly. Although a pool and spa are provided as a specific example, it should be appreciated that the same principles are applicable with respect to a first body of water and a second body of water. In some instances, the first body of water includes more water than the second body of water. In other instances, the first body of water includes less water than the second body of water. In a further instance, the first body of water includes about the same amount of water as the second body of water.

In some embodiments, the chemical controller 102 may be in communication with the power of a main circulation pump (e.g., the pump 110) so that when the pump is shut off, the chemical controller is also shut off. Many other configurations and control operations between the chemical controller 102 and the primary controller 106 (if required and present) are possible, as one of ordinary skill in the art will understand.

Communication may be effected between the primary controller 106 and the chemical controller 102 through dry contact relay, RS-232, RS-422, RS-485, USB, Ethernet, WiFi, or many other wired and wireless communication protocols. Similarly, in accordance with various embodiments, the primary controller 106 and the chemical controller 102 may communicate with other respective devices (e.g., pumps 110, 122, 124, heater 112, etc.) through the same or other communication protocols.

In normal operation, errors or faults may occur in the operation of one or more output relays 204 (see FIG. 2) of the chemical controller 102. For example, an error may occur that causes one or more output relays 204 to remain closed (e.g., through logical or processor fault, or by physical welding of relay contacts). In such an instance, the chemical controller 102 could inadvertently continuously disperse chemicals 126, 128 into the aquatic application 104, which could upset the balance of chemicals in the aquatic application 104, possibly creating non-ideal water characteristics.

Figure 2:
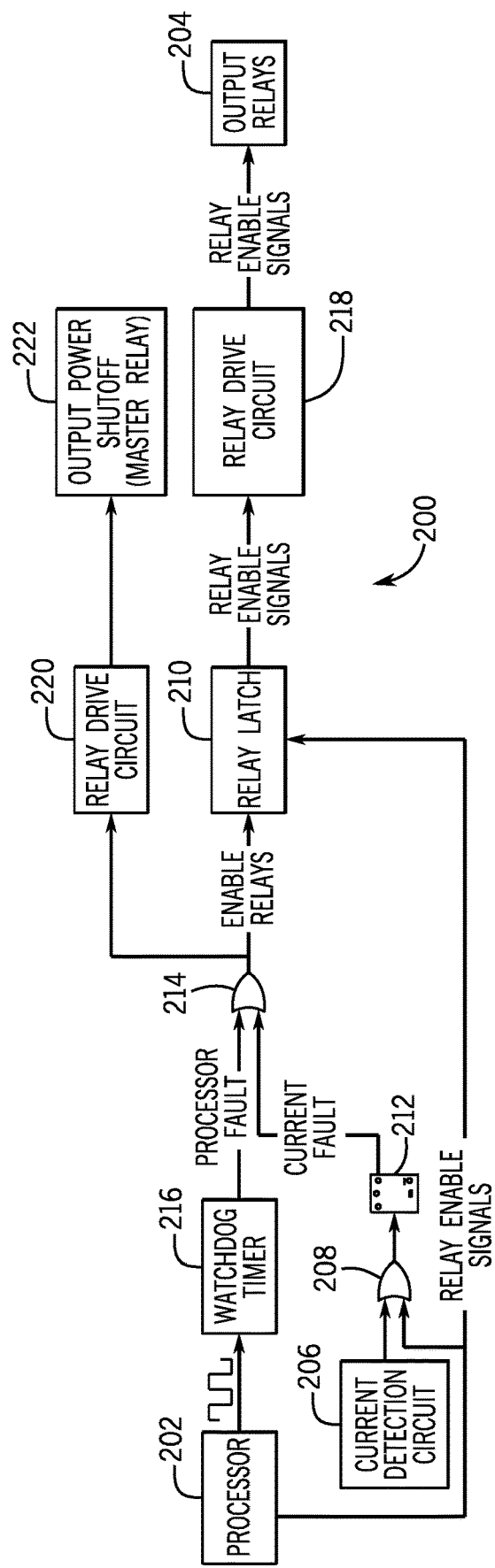
FIG. 2 is a block diagram of a safety circuit of the chemical controller of FIG. 1 in accordance with various embodiments.

Turning now to FIG. 2, a block diagram of a safety circuit 200 for use within the chemical controller 102 is illustrated in accordance with various embodiments. In one approach, the safety circuit 200 may include, cooperate with, or operate in tandem with a processor 202, which may be any known processing device or programmable gate array, including, for example, a microprocessor, a central processor, an ARM processor, a PIC processor, a RISC processor, an FPGA, an ASIC, or other known processor types. In various embodiments, the processor 202 controls the primary operations of the chemical controller 102, including operations of one or more output relays 204 through various relay enable signals. Although only one output relay 204 is illustrated, it is understood that the chemical controller 102 may have any number of output relays 204 as may be suitable in a given application setting. The output relays 204 control operations of various devices, for example, the pumps 122, 124 shown in FIG. 1.

The safety circuit 200 may also include a current detection circuit 206 configured to detect current on the output lines of the output relays 204. Such current may be as a result of a powered output connection, including, for example, a line-voltage alternating current supply (e.g., 120 VAC) or a low-voltage direct current supply (e.g., 12 VDC or 24 VDC) provided through the output relay 204 output contacts. In addition, the current detection circuit 206 may detect current flowing through the output relays 204 in a dry-contact configuration, which may include very low currents. In operation, and in accordance with one embodiment, the current detection circuit 206 generates a logical signal (e.g., high or low) indicating the presence or absence of current on the output contacts of an individual output relay 204. Multiple current detection circuits 206 may be provided, for example, including one for each output relay 204.

The output signal from the current detection circuit 206 (for example, for a first output relay) may be fed into a current fault detection device. The current fault detection device may comprise a first logic gate 208, for example a NOR gate, as shown in FIG. 2 (though other logic gate types may be suitable in other configurations). The relay enable signals for the particular relay (for example, the first output relay) may also be fed into the first logic gate 208 from the processor 202. In accordance with at least one embodiment, the first logic gate 208 outputs a current fault signal if the output from the current detection circuit 206 indicates the presence of current, but the particular relay enable signal is not set to activate that particular relay. For example, the current detection circuit 206 may be configured to output a low signal in the presence of output current and a high signal in the absence of output current. Conversely, in the same example, a relay enable signal for a particular output relay may be high if activated and low if deactivated. Feeding these signals into the example NOR gate (as the first logic gate 208) will yield a low output signal from the logic gate 208 in every instance except where both input signals are low, corresponding to a situation where output current is detected while the particular output relay 204 is supposed to be deactivated. This is an error signal and indicates a current fault condition (e.g., the output relay is stuck in the activated position, for example, through relay device failure, contact welding, or other failures). It should be noted that either of the signals, and particularly the current detection circuit 206 output signal, may be subjected to a delay to account for real-life operational delays in relay switching conditions.

In one embodiment, the output from the first logic gate 208 (e.g., a current fault signal) is used to enable a relay latch 210, either by directly feeding the output into the relay latch 210 or by sending the output through one or more other components, for example, a current fault latch 212, a second logic gate 214, and/or any other circuit component as is needed according to various approaches. The relay latch 210 may be configured so that the current fault signal (output from the logic gate 208) may effect the disabling of operation of the outputs of the relay latch 210, thereby preventing activation of one or more of the output relays 204 if a current fault condition is detected at one of the output relays 204.

In one embodiment, the current fault signal is run though a current fault latch 212 (for example, a D-latch) to latch the current fault signal to a tripped fault state once a current fault occurs. By this, the output relays 204 remain in an inoperative state (by decoupling the inputs and the outputs of the relay latch 210 according to the status of the current fault signal) and further activation of the output relays 204 is inhibited until the issue is addressed. In another embodiment, an error indicator (for example, an LED 408 of FIG. 4, an audio indicator, or another indication device) may also be activated, thereby alerting a user of the current fault.

In one approach, the current fault signal passes through the second logic gate 214, for example, an OR gate, along with another fault condition signal (e.g., a processor fault signal). In the embodiment shown in FIG. 2, the current fault signal is fed into an input of the OR gate 214 along with a processor fault signal that is output from a watchdog timer 216. The watchdog timer 216 will output a processor fault signal if the processor 202 fails to send a reset signal to the watchdog timer 216 before its timer reaches zero. Such a condition is indicative of a hung processor. Use of the watchdog timer 216 and the ensuing creation of the processor fault signal is not required in each embodiment, but may be provided in addition to, or in lieu of, the current fault signal. By this, in various embodiments, deactivation of the output relays could be tied only to a processor fault, only to a current fault, or to either or both of these fault types.

In the embodiment illustrated in FIG. 2, the enable relays signal output from the second logic gate 214 takes into account both the current fault signal and the processor fault signal. The enable relays signal can be fed to an output enable (OE-bar) input pin of the relay latch 210 to effect operation of the relay latch 210 outputs. The outputs from the relay latch 210 can in turn be fed to a relay drive circuit 218 to generate the current necessary to activate or switch the output relays 204. Thus, in operation, in one embodiment, if the enable relays signal is low (indicative of normal, non-fault operation), the individual relay latch 210 outputs will be coupled to the individual relay latch inputs (the inputs having the individual relay enable signals for each relay, e.g., from the processor 202). This configuration makes the relay drive circuit 218 activate or deactivate a particular output relay 204 according to the status of the individual relay enable signal from the processor. However, if the enable relays signal from the second logic gate 214 is high (indicative of a fault condition), the relay latch 210 outputs may go to high impedance, thereby decoupling their output operation from the corresponding input signal, and deactivating the output relays 204 independent of the state of the input signal sent to the relay latch 210. As such, the enable relays signal can act to enable or disable one or all of the relay latches 210 dependent upon a fault condition.

In another embodiment, a secondary mechanism of deactivating the output relays 204 in the event of a fault is utilized. The secondary mechanism may be used in addition to, or in lieu of, the first method (e.g., the use of the relay latch 210). In this embodiment, the enable relays signal (output from the second logic gate 214) is also sent to a second relay drive circuit 220. The second relay drive circuit 220 in turn controls an output power shutoff master relay 222. The output power shutoff master relay 222 operates to disconnect supply power supplied to the output relays 204 upon the occurrence of a current fault and/or a processor fault. This is most beneficial when one or more of the output relays 204 are configured in a powered configuration (as opposed to a dry contact configuration). For example, if an output relay 204 is configured to provide output power upon activation (for example, but not limited to 120 VAC, 240 VAC, 12 VDC, or 24 VDC), and one or more of the output relay contacts becomes welded or otherwise stuck in an activated position, the output relay 204 would continue to convey output power independent of the particular relay activation signal (e.g., from the relay drive circuit 218 or earlier in the signal chain). In such an instance, disabling of the relay latch 210 outputs via the enable relays signal (e.g., output from the second logic gate 214) may not serve to deactivate the stuck output relay 204, and the stuck output relay 204 may continue to provide output power regardless. However, if a fault condition (e.g., current fault condition) is detected, the output power shutoff master relay 222 can be deactivated, thereby disconnecting the output power from the stuck output relay 204, and thereby preventing continuous delivery of chemicals 126, 128 via the pumps 122, 124 into the aquatic application 104. The output power shutoff master relay 222 thereby serves as a redundant relay when the output relays 204 are configured in a powered output configuration.

A similar relay redundancy configuration may exist when the output relay is configured in a dry contact configuration, and is described below with respect to FIG. 6.

Figure 3:
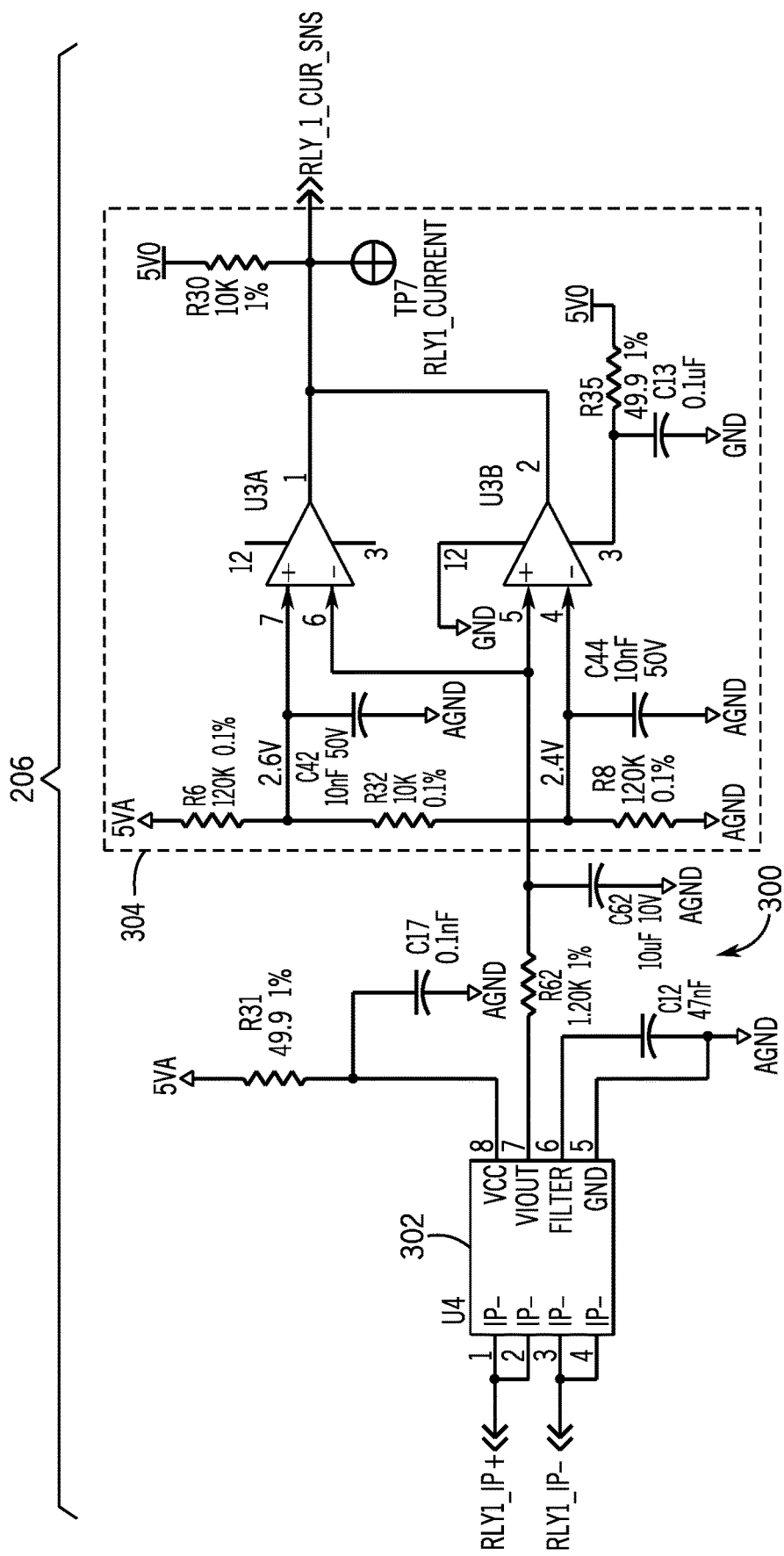
FIG. 3 is a schematic representation of a current detection circuit of the safety circuit of FIG. 2 in accordance with various embodiments.

Turning now to FIG. 3, a schematic circuit 300 is provided illustrating the current detection circuit 206 in accordance with various embodiments. An output contact of one of the output relays 204 is first sent through a current sensing device 302 prior to being sent out of the terminal contacts and across a load. Alternatively, the current may pass through the current sensing device 302 upon its return from the load and prior to being sent back through the output relay 204. This signal is shown as RLY1_IP+ out of the output relay 204 and RLY1_IP− being sent to the terminal to which a user or installer connects the load. (See FIG. 6). In one embodiment, the current sensing device 302 may output a voltage corresponding to the sensed amount of current. The output from the current sensing device 302 may then be fed to a window comparator 304 as is understood in the art. The window comparator 304 may be configured such that its output signal (RLY_1_CUR_SNS) is a logic 1 (high) if the output voltage of the current sensing device 302 is within a window, for example, centered around 0 volts. This indicates a low current or no current through the current sensing device 302 (indicating low or no current across the output relay 204). The window comparator 304 may also be configured such that its output signal (RLY_1_CUR_SNS) is a logic 0 (low) if the output voltage of the current sensing device 302 is outside of the no-current window. In one example, the window comparator 304 may be configured to output a logic 0 (indicating the presence of current) if the current through the current sensing device 302 exceeds +/−100 mA. This lower current setting should adequately account for current in either of both configurations of the output relays (powered output or dry contact output). However, in other approaches, the window comparator 304 may be modified such that the logical switching point is at a lower or higher current value and may be determined based on the needs of a particular application setting. Further, the polarity of the output signal may be inverted or otherwise altered as needed.

Figure 4:
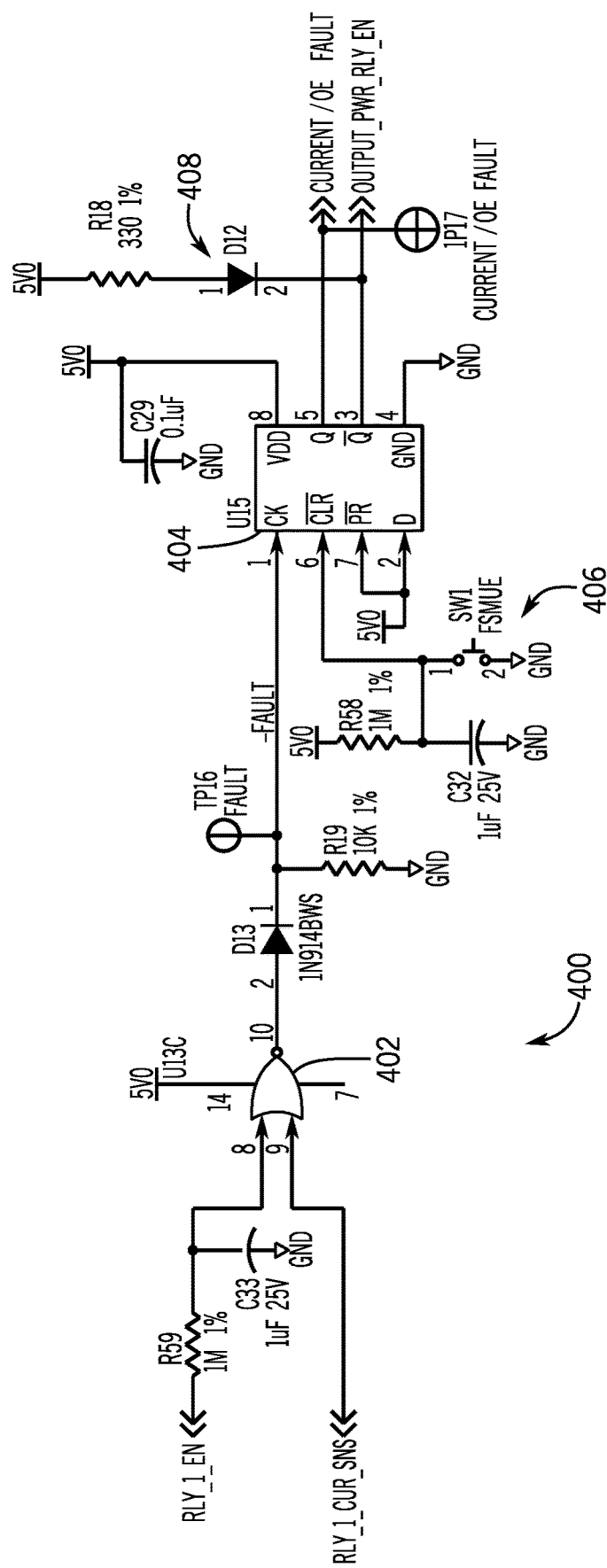
FIG. 4 is a schematic representation of a current fault latch circuit of the safety circuit of FIG. 2 in accordance with various embodiments.

Turning now to FIG. 4, an example current fault latch circuit 400 is illustrated in accordance with various embodiments. The current fault latch circuit 400 may correspond to the current fault latch 212 of FIG. 2 in at least one embodiment. The window comparator 304 output signal (RLY_1_CUR_SNS) may be fed into a NOR gate 402 (corresponding to the first logic gate 208 of FIG. 1 in one embodiment) along with an individual relay enable signal (RLY_1_EN) that indicates a command to activate the associated output relay 204 (here, for output relay 1). In one approach, the NOR gate 402 will output a low output signal in every instance except where both input signals (RLY_1_CUR_SNS and RLY_1_EN) are low, corresponding to a situation where output current is detected while the particular output relay 204 is supposed to be deactivated. Thus, if there is a current fault, the output of the NOR gate 402 will go to logic high.

In one embodiment, the output of the NOR gate 402 is fed to the clock input of a D-latch 404. The D input of the D-latch 404 may be connected to a logic high signal. In operation, if a current fault is detected and the output of the NOR gate 402 goes to logic high, the rising edge on the clock input of D-latch 404 will cause the D-latch 404 to place whatever is at the D input (here, a logic 1) at the output Q (signal CURRENT/OE FAULT) and its inverse at Q-bar (signal OUTPUT_PWR_RLY_EN), where that output will remain until cleared. In one embodiment, the output may be cleared through operation of a pushbutton 406, which will reset the D-latch 404 and clear the current fault error signal. Also, in some embodiments, cycling power to the chemical controller 102 can clear the current fault signal. A current fault indicator 408 (e.g., LED) may be coupled to the output of the D-latch 404 (for example, the inversed Q-bar output) and can be illuminated when the current fault is detected. Other indicators may be possible, including other visual or auditory indicators. Also, the output signal may be sent back to the processor 202 for further handling (e.g., to effect further communication of the fault to a user, for example through emailing a notification to the user).

Figure 5:
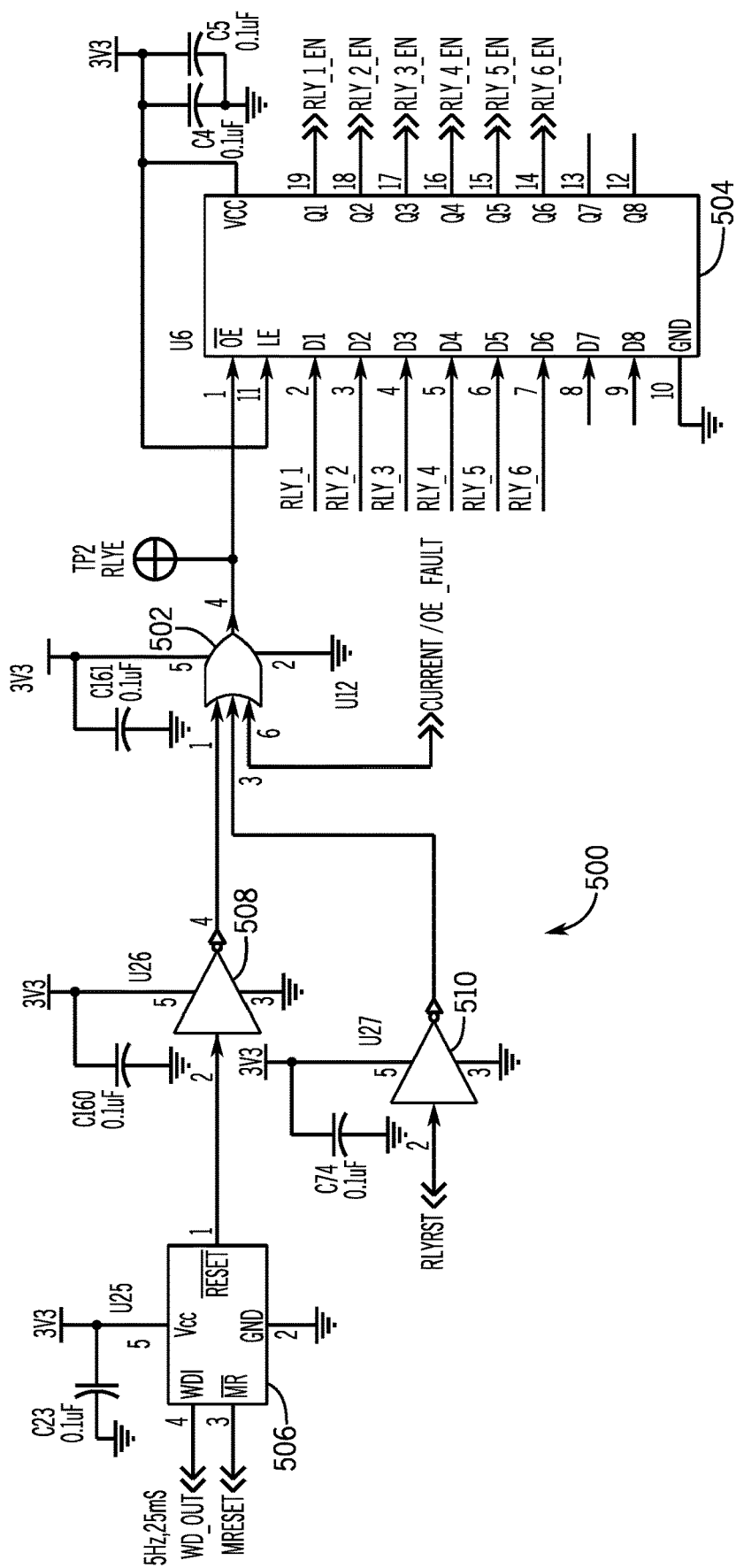
FIG. 5 is a schematic representation of a relay latch and watch dog timer circuit of the safety circuit of FIG. 2 in accordance with various embodiments.

Turning now to FIG. 5, an example relay latch and watch dog timer circuit 500 is illustrated in accordance with various embodiments. In one embodiment, the output signal CURRENT/OE FAULT from the D-latch 404 of FIG. 4 is coupled to an input of a logic OR gate 502 (corresponding to the second logic gate 214 in FIG. 1 in one embodiment). The functionality of the logic OR gate 502 is such that it will output a logic high signal if the CURRENT/OE FAULT signal from the D-latch 404 is high, or if any other input to the logic OR gate 502 is logic high. The output of the logic OR gate 502 is coupled to an output enable (OE) input pin of a relay latch 504 (corresponding to the relay latch 210 of FIG. 2 in one embodiment).

In one embodiment, the logic OR gate 502 may have other fault signals coupled to its inputs, including, for example, the processor fault signal. The watch dog timer circuit 500 may include a watchdog timer 506 (which may correspond to watchdog timer 216 in one embodiment) that receives intermittent watchdog pulses or pings from the processor 202. If the watchdog timer 506 does not receive a ping from the processor 202 within an allotted time, the watchdog timer 506 is configured to assume the processor 202 has hung and will output a reset signal (e.g., by forcing an output reset signal to a logic low state), which corresponds to a processor fault signal. The reset signal/processor fault signal can be passed through an inverter 508, if needed, so that the polarity of the processor fault signal is such that a processor fault results in a logic high, which is in turn coupled to an input of the logic OR gate 502.

In another embodiment, the logic OR gate 502 may receive a relay reset signal (RLYRST). The relay reset signal may be asserted logic high, for example, during initiation and startup of the processor 202 to prevent the output relays 204 from being triggered by random signals output on various ones of the output pins of the processor 202 during the startup. The relay reset signal may be passed through an inverter 510, if needed, to achieve the proper polarity.

In one approach, the output of the logic OR gate 502 is coupled to the output enable (OE-bar) input pin of the relay latch 504. The relay latch 504 is configured such that if the output enable input is logic low, then the outputs (Q) are coupled to the inputs (D). However, if the output enable input is high, all outputs go to high-impedance off-states. The relay enable signals (for each individual output relay 204) are coupled to the inputs (D) of the relay latch 504 and the corresponding outputs (Q) are subsequently coupled to corresponding relay drive circuits 218 to activate or deactivate the corresponding individual output relays 204. So configured, if the output enable (OE-bar) input of the relay latch 504 (coupled to the output of the logic OR gate 502) is logic high, all output relays 204 will be cut-off from their respective individual relay enable signal, thereby causing deactivation of each output relay 204 independent of the state of the corresponding relay enable signal (e.g., from the processor 202). In the illustrated embodiment, a current fault, a processor fault, and/or a relay reset signal can operate to disable the outputs of the relay latch 504.

Figure 6:
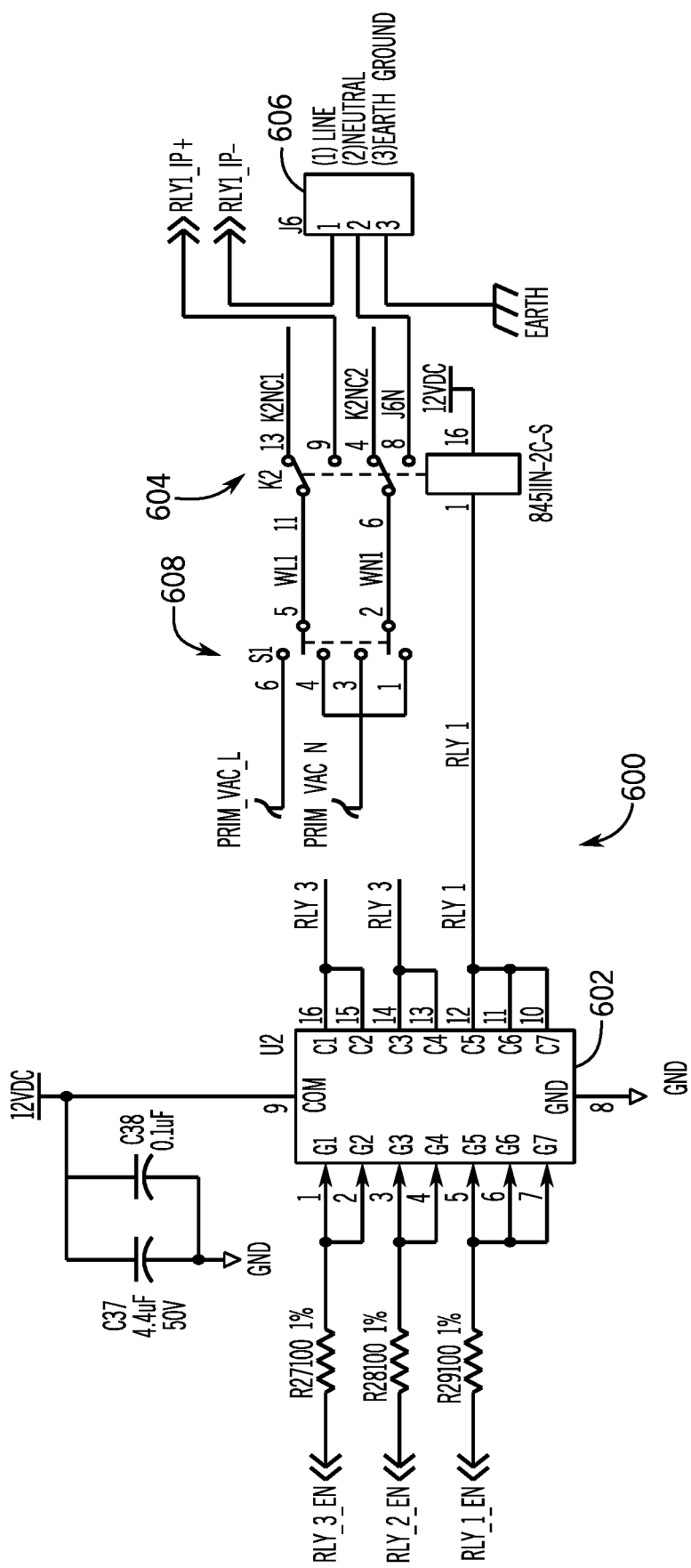
FIG. 6 is a schematic representation of a relay drive and output relay circuit of the safety circuit of FIG. 2 in accordance with various embodiments.

Turning now to FIG. 6, a relay drive and output relay circuit 600 is illustrated in accordance with various embodiments. A relay drive device 602 (corresponding to the relay drive circuit 218 of FIG. 2 in one embodiment) receives individual relay enable signals from the outputs of the relay latch 504 (e.g., RLY_1_EN). In one embodiment, the relay drive device 602 is a Darlington transistor array circuit having one or more Darlington transistor circuits to drive each corresponding output relay 204. As shown in FIG. 6, multiple inputs and corresponding outputs are tied together in parallel to provide redundant functionality, to improve current sinking abilities, and to increase dependability among other things. In this example, an output of the relay drive device 602 is tied to a first output relay 604 (corresponding to at least one of the output relays 204 of FIG. 2 in one embodiment). In one embodiment, the first output relay 604 is a double-pole double-throw (DPDT) relay, though many other relay types may be suitable as needed, including, for example, a double-pole single-throw (DPST) relay, or one or more individual SPST or SPDT relays.

When the relay drive device 602 drives current through the first output relay 604, the first output relay 604 will switch ("throw") the relay poles from a first set of output contacts (here shown as unused) to a second set of output contacts. This allows the second set of output contacts to be galvanically coupled to the relay inputs through the first output relay 604. The second set of output contacts are optionally coupled to a terminator or a connector 606 (with one or both signals first possibly passing through the current detection circuit 206, 302, as shown in FIGS. 2 and 3 and discussed above). The connector 606 may be provided to enable a user to easily access and connect a load (e.g., a pump, etc.) to the output contacts of the first output relay 604.

According to various embodiments, the inputs of the first output relay 604 may be connected in one of two ways. First, for a powered output application (where power is provided through the first output relay 604), the inputs of relay 604 are coupled to a power supply with each input tied to a different voltage potential. In this situation, current flows from the power supply into a first input of the relay 604, through a first pole of the first output relay 604, through the current sensing device 302, out one contact of the connector 606, across the load, back in through the other contact of the connector 606, back through the second pole of the first output relay 604, out the second input of the relay 604, and back to the power supply. When the first output relay 604 is deactivated, this current path is broken.

In a second configuration, the output relay 604 is configured as a dry contact relay. The inputs of relay 604 are coupled or shorted together to form a path through which current (provided by the external device) can pass, thereby instructing the external device to operate. The dry contact instead may provide some other single-bit binary data to the external device, for example, an indication of a particular condition, permission to operate as needed, or some other information. When the first output relay 604 is deactivated, the current path is broken and the connected external device acts accordingly.

In one embodiment, a selector switch 608 may be included to select which configuration the first output relay 604 (or any other output relay 204) is in (e.g., powered or dry contact). In one approach, the selector switch 608 is a DPDT switch, though other switch types may be suitable in various approaches. When the selector switch 608 is in a first position, the inputs of the first output relay 604 may be coupled to a power source (e.g., 120 VAC, 24 VDC, etc.) to configure the first output relay 604 in a powered configuration. When the selector switch 608 is in a second position, the inputs of the first output relay 604 are coupled together through a loopback path to configure the first output relay 604 in a dry contact configuration.

In another embodiment, a FET or other switch (not shown) may be provided in the loopback path (the loopback path shorting the two inputs of the first output relay 604). The FET may act as a redundant disable mechanism in the instance that a current fault or processor fault is detected when the first output relay 604 is in a dry contact configuration. The gate of the FET may be coupled to, for example, the enable relays signal from the output of the second logic gate 214 (e.g., the logic OR gate 502 of FIG. 5), or an inverted version thereof. If a fault is detected, in addition to the other failsafe mechanisms and redundancies described herein, the FET can open thereby destroying the short circuit loopback path. In another approach, the gate of the FET may be tied to the same corresponding individual relay enable signal, for example, that is output from the relay latches 210. If, for example, the first output relay 604 had welded in a closed position while in a dry contact configuration, opening the loopback path with the FET would serve as an additional mechanism to open the dry contact path, thereby preventing false commands provided to external devices due a failure at the first output relay 604.

The described configuration involving any of the first output relay 604, the connector 606, the selector switch 608, and/or the loopback FET may be repeated and individually controlled for as many output relays 204 as is desired or required in a particular application setting. For example, in one approach (e.g., a residential approach), three output relays 204 may be provided, while in another approach (e.g., a commercial approach), six output relays 204 may be provided. Any other number of output relays may be provided as suitable for a particular application.

Figure 7:
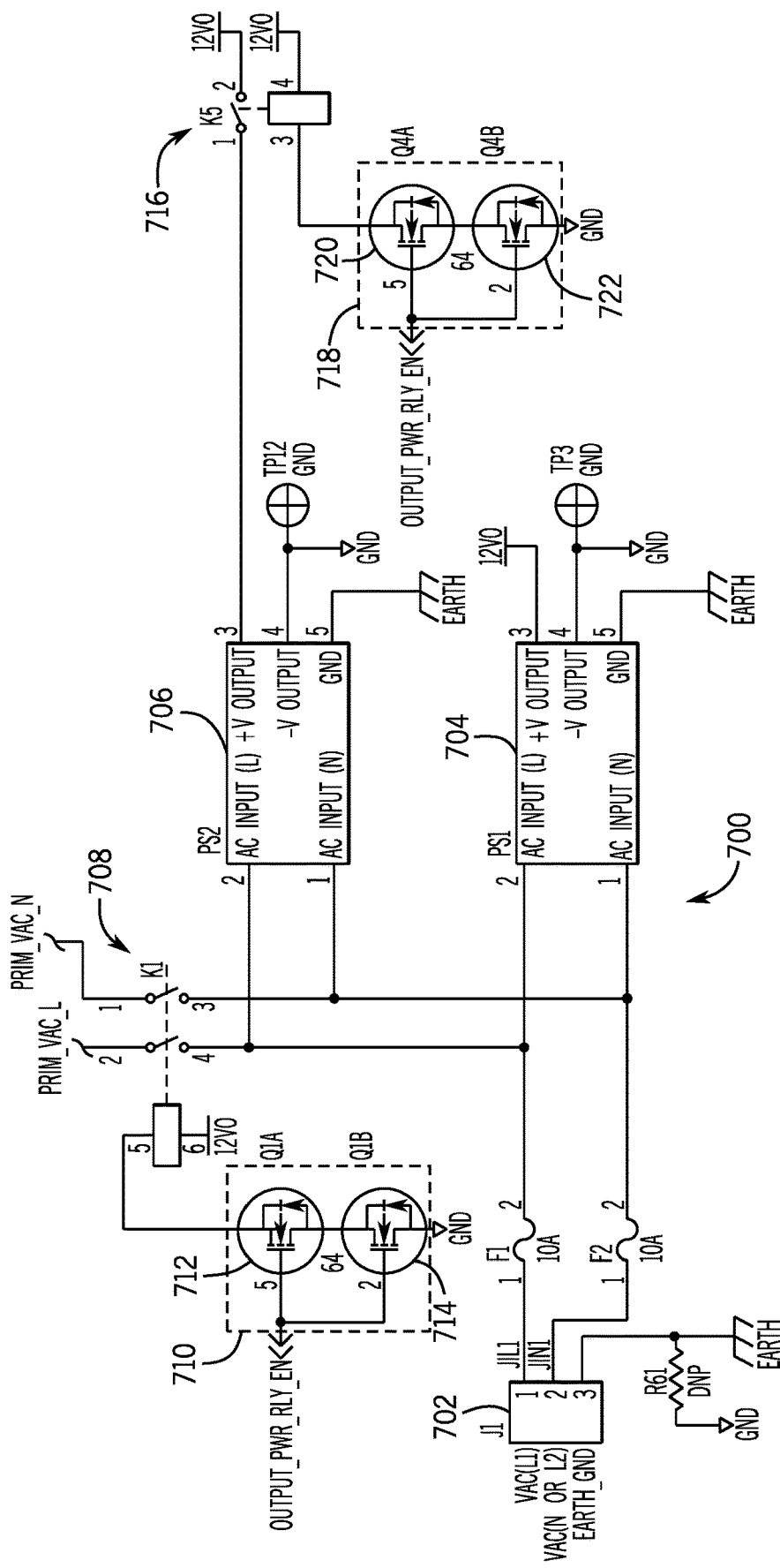
FIG. 7 is a schematic representation of an output power shutoff circuit of the safety circuit of FIG. 2 in accordance with various embodiments.

Turning now to FIG. 7, an output power shutoff circuit 700 is illustrated in accordance with some embodiments. The circuit 700 may include a power line-in connector or terminator 702, a first power converter 704 (e.g., for 12 VDC), and/or a second power converter 706 (e.g., for 24 VDC). In certain embodiments, only one power converter may be utilized, for example, the first power converter 704 (e.g., in a commercial application), while in other application settings both power converters 704, 706 may be provided.

In one embodiment, the power shutoff circuit 700 includes a first output power shutoff relay 708 (corresponding to the output power shutoff master relay 222 of FIG. 2 in one embodiment). As described above with respect to FIG. 2, the first output power shutoff relay 708 serves as a redundancy to the output relays 204 when the output relays 204 are configured in a powered configuration. The first output power shutoff relay 708 may be a DPST relay (though other configurations are possible) and will allow the power (in this instance, 110 VAC line voltage from line-in connector 702) to be passed on to various ones of the output relays 204 (e.g., on signals PRIM_VAC_L and PRIM_VAC_N, which can also be seen in FIG. 6) in a first position and will disconnect the power in a second position.

The power shutoff circuit 700 also may include a first output power relay drive circuit 710 (corresponding to the second relay drive circuit 220 of FIG. 2 in one embodiment) to provide current to activate the first output power shutoff relay 708. In one approach, the first output power relay drive circuit 710 includes a first FET 712 and a second FET 714 (or other switching transistor types) in series between the relay and ground (or 12 VDC) such that when both FETs are active, current flows through the first output power shutoff relay 708 to activate the relay 708. Two FETs are used to provide a fail-safe redundancy in case one FET becomes shorted. Both of the FETs 712 and 714 are controlled by an enable power relay signal. For example, this signal may be the OUTPUT_PWR_RLY_EN signal output from the Q-bar output of the D-latch 404 of the current fault latch circuit 400 shown in FIG. 4. In such a configuration, if a current fault is detected, both FETs 712 and 714 open to prevent current flow to thereby deactivate the first output power shutoff relay 708 to disconnect output power from the output relays 204. In other approaches, the FETs 712 and 714 may receive an enable power relay signal from the output of the second logic gate 214 (e.g., logic OR gate 502), or its inverse, to also cut the power in the case of a processor fault.

In another embodiment, the power shutoff circuit 700 may also include a second output power shutoff relay 716 and a corresponding second output power relay drive circuit 718 (for example, including a third FET 720 and a fourth FET 722), which may be configured similar to or identical to the first output power shutoff relay 708 and corresponding drive circuit 710, except that the second output power shutoff relay 716 acts to disconnect a different power supply. For example, the second output power shutoff relay 716 may disconnect the 24 VDC power output from the second power converter 706 instead of line power (or any other utilized power source). Also, when using DC voltage, a SPST relay may be used as the second output power shutoff relay 716 to disconnect only the non-ground line.

In certain embodiments, particularly embodiments where a low voltage pump (e.g., 24 VDC, etc.) may be powered by and through the chemical controller 102, a different configuration may be provided for the output. In one approach, instead of a relay being supplied at the output terminals (e.g., connector 606), a power or current source may be provided instead and coupled to the output terminal directly. For example, and referring again to FIG. 6, in this alternative embodiment, the relay 604 may be omitted and a device similar to the relay drive device 602 (e.g., a Darlington transistor array) may have one, some, or all of its outputs coupled to the connector 606 to provide current and power to the output (instead of being coupled to the relay 604 to drive the relay). Thus, when the relay drive device 602 is activated, power is supplied directly to the connector 606.

In this alternative approach, a different current sense circuit may be utilized, for example, a transistor may be used to sense the presence of current. A current sense transistor may be configured such that its base or gate is coupled to the output of the relay drive device 602, possibly through a base resistor, such that when current is present on the output terminal, the transistor will switch on, allowing a current to flow through the collector and emitter (or source and drain) of the transistor, thereby allowing current to flow through a pull-down or a pull-up resistor to create a current sense signal. Other configurations are possible, as well.

In accordance with various embodiments described throughout, sensing and control of the fault conditions can be undertaken through the use of discreet logic that is external to the processor 202 (certain embodiments may similarly utilize an FPGA or similar device). By keeping these activities external to the processor 202, the failsafe mechanisms are not subject to processor issues (e.g., a hung processor). Further, the use of discreet logic offers a cost-effective and robust solution.

It will be appreciated by those skilled in the art that signals can propagate through one or more devices (e.g., OR gates, latches, etc.) and can exist with an original or inverted polarity while still serving the intended purpose of the signal. Many variations are possible as to the propagation of signals and discussion of a particular signal does not necessarily indicate that it is limited to one form of that signal located at one location (e.g., one circuit node or one component).

So configured, and in accordance with various configurations, the chemical controller 102 and corresponding methods are provided with the safety circuit 200 that can detect at least one fault condition (e.g., a current fault, a processor fault, or both) and can responsively disable one or more output relays 204 via one or more methods. For example, upon occurrence of a fault condition, the safety circuit 200 can disable the output relays by preventing an activation of all the output relays with signals sent from the processor 202 (e.g., through the relay latch 210), by shutting off the output power sent to the output relays 204 (e.g., with output power shutoff master relay 222), or by opening a dry contact loopback path with one or more FETs (e.g., as discussed with respect to FIG. 6). By this, continuous unintentional provision of power or dry contact assertion at one or more of the output relays 204 can be prevented. This, in turn, can prevent unintentional operation of one or more external devices, such as the pumps 122 or 124. In preventing such unintentional operations, a situation can be avoided where the pump 122 or 124 may continuously deliver chemicals 126 or 128 into the aquatic application 104, which may create a non-ideal water condition.

FIG. 8 depicts one embodiment of an enclosure 800 for the chemical controller 102. The enclosure 800 is designed to present data and other information to a user of the chemical controller 102 and to allow the user to set and/or manipulate various operating, maintenance, and security parameters. The enclosure 800 is provided in the form of a substantially square box and can include a graphic overlay 802 on a cover 804 of the enclosure 800. Various internal components (not shown) are retained within the enclosure and allow the chemical controller 102 to be in communication with one or more of the primary controller 106, the pumps 122, 124, the secondary sensors 130, and other components associated with the aquatic application 104. The enclosure 800 acts to protect the components to prevent damage via the chemicals 126, 128, water, humidity or other environmental elements. The cover 804 of the enclosure 800 may be releasably secured so that the user may access the interior of the enclosure 800 during maintenance or other procedures.

The graphic overlay 802 is provided on the front surface of the enclosure 800 and may be provided with a reference chart 806. The reference chart 806 can provide a user with general guidelines for water chemistry values including one or more of pH Range, Oxidation Reduction Potential (ORP) range, alkalinity levels, calcium hardness levels, cyanuric acid/stabilizer values, etc. The user may consult the reference chart 806 when one or more of the above parameters are being programmed into the chemical controller 102. Additionally, a user may be able to quickly determine if one of the water chemistry values is outside of a normally accepted range by comparing the actual water chemistry value to the associated parameter on the reference chart 806.

The cover 804 can further include a display 808 that is designed to present system and status information to the user. In one embodiment, the display 808 can be a liquid crystal display (LCD). Alternatively, the display 808 can be an OLED display, an LED display, or any other type of display, as applicable. In some examples, the display 808 is backlit. In one embodiment, the display 808 can be programmable to allow for different display modes. For example, one display mode can be a "basic" mode, where only two system or water chemistry values (e.g., the pH and the ORP values) are displayed. Other display modes can be programmed to present additional information to the user such as alarm messages and process timers. Further, the display 808 can be used to view settings and menus within the chemical controller 102.

The enclosure 800 can further include one or more visual indicators that are designed to provide information about the chemical controller 102 and/or one or more components of the aquatic application 104. For example, a flow indicator 810 provided in the form of a light-emitting diode (LED) is included on the enclosure 800 and can visually indicate when flow has been detected. In one embodiment, the flow indicator 810 can flash or blink during flow delay or low flow conditions, and/or indicate a no flow condition when not illuminated. In other embodiments, the flow indicator 810 may be lit in a first color (e.g., green) to indicate normal flow, may be lit in a second color to indicate flow delay, and a third color to indicate no flow. In a no-flow condition, the chemical controller 102 does not permit chemicals 126, 128 to be distributed into the aquatic application 104.

The enclosure 800 also optionally includes an alarm indicator 812 that can visually indicate if an alarm condition has occurred. The alarm indicator 812 is also provided in the form of an LED and may be illuminated if an alarm condition is present. For example, if one or more of the water chemistry parameters have exceeded a threshold level, the alarm indicator 812 may illuminate to indicate a problem with the aquatic application 104. Additionally, the chemical controller 102 may be programmed to shut off any chemical 126, 128 distribution into the aquatic application 104 while an alarm condition is present.

The enclosure 800 also includes one or more settings buttons that allow the user to configure the chemical controller 102. For example, the enclosure 800 is provided with a pH settings button 814 and/or an ORP settings button 816. The pH settings button 814 can be used to access the pH settings and parameters using the display 808. Further, the oxidation reduction potential ("ORP") settings button 816 can be used to access the ORP settings and parameters using the display. For example, both the pH settings button 814 and ORP settings button 816 can allow a user to override a previously programmed level with respect to the pH and ORP parameters of the water by using an override command to direct the chemical controller to distribute one or more chemicals that will impact the water chemistry. The override command allows the user to manually control the amount of chemicals being distributed into the aquatic application 104. The user may also be able to monitor and view the chemical 126, 128 levels within the storage containers to determine if sufficient chemicals are available to be dispensed into the aquatic application 104 or if the chemicals need to be replaced.

Various additional buttons may be provided on the enclosure 800 to facilitate control of the chemical controller 102 including a menu button 818, left and right arrow buttons 820, 822 and up and down arrow buttons 824, 826. The menu button 818 can provide access to a main menu of the chemical controller 102. The left and right arrow buttons 820, 822 and up and down arrow buttons 824, 826 can allow for navigation through the menu, as well as to adjust parameters or settings.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A method of controlling an output relay of a chemical controller, the output relay being coupled to a pump, and the pump configured to introduce at least one chemical into an aquatic application, the chemical controller controlling an operation of the pump using the output relay, the method comprising:
    utilizing a watchdog timer circuit to determine that a processor has failed to send a reset signal to the watchdog timer circuit before a timer of the watchdog timer circuit reaches zero;
    outputting a processor fault signal from the watchdog timer circuit upon determining that the processor has failed to send the reset signal;
    decoupling a relay enable signal from a corresponding relay latch output based on the processor fault signal; and
    transmitting a signal to a relay drive circuit from the corresponding relay latch output, the relay drive circuit configured to activate and deactivate the output relay based on the received signal.

2. The method of claim 1, further comprising:
    detecting a current on an output of the output relay using a current sensor; and
    with a current fault detection circuit, outputting a current fault signal indicative of a current fault condition that occurs when current exists on the output of the output relay while the output relay is instructed to be deactivated via a corresponding relay enable signal.

3. The method of claim 2, further comprising decoupling the relay enable signal from the corresponding relay latch output when the current fault signal indicates the current fault condition.

4. The method of claim 1, wherein the processor fault signal is indicative of an occurrence of a hung processor.

5. The method of claim 4, further comprising removing an output power provided to the output relay when the processor fault signal indicates the occurrence of the hung processor.

6. The method of claim 1, further comprising receiving the processor fault signal at a logic gate and outputting a logic gate signal.

7. The method of claim 6, further comprising receiving the logic gate signal at a second relay drive circuit.

8. The method of claim 7, further comprising controlling a power master relay by the second relay drive circuit.

9. The method of claim 1, wherein an output power to the output relay is removed by deactivating a power master relay.

10. A method of controlling an output relay of a chemical controller, the output relay being coupled to a pump, and the pump configured to introduce at least one chemical into an aquatic application, the chemical controller controlling an operation of the pump using the output relay, the method comprising:
   utilizing a watchdog timer circuit to determine that a processor has failed to send a reset signal to the watchdog timer circuit before a timer of the watchdog timer circuit reaches zero;
   outputting a processor fault signal from the watchdog timer circuit upon determining that the processor has failed to send the reset signal;
   controlling, by a relay drive circuit, an output power master relay based on the processor fault signal, the output power master relay providing output power to the output relay; and
   deactivating the output power master relay thereby disconnecting the output power to the output relay.

11. The method of claim 10, further comprising receiving the processor fault signal at a logic gate and outputting a logic gate signal to the relay drive circuit.

12. The method of claim 11, further comprising transmitting the logic gate signal to a relay latch.

13. The method of claim 10, further comprising decoupling a relay enable signal from a relay latch output based on the processor fault signal.

14. The method of claim 13, further comprising transmitting a signal to a second relay drive circuit from the relay latch output, the second relay drive circuit configured to activate and deactivate the output relay based on the signal transmitted to the second relay drive circuit.

15. The method of claim 10, further comprising:
   detecting a current on an output of the output relay using a current sensor; and
   with a current fault detection circuit, outputting a current fault signal indicative of a current fault condition that occurs when current exists on the output of the output relay while the output relay is instructed to be deactivated via a corresponding relay enable signal.

16. The method of claim 15, further comprising decoupling a relay enable signal from a relay latch output when the current fault signal indicates the current fault condition.

17. The method of claim 10, further comprising pumping a chemical into the aquatic application with the pump.

18. The method of claim 10, further comprising sensing chemical attributes of the aquatic application.

19. The method of claim 18, further comprising regulating a feed of chemicals pumped into the aquatic application by the pump in response to the chemical attributes.

20. A method of controlling an output relay of a chemical controller, the output relay being coupled to a pump, and the pump configured to introduce at least one chemical into an aquatic application, the chemical controller controlling an operation of the pump using the output relay, the method comprising:
   utilizing a watchdog timer circuit to receive a signal from a processor;
   monitoring the signal from the processor using the watchdog timer circuit;
   receiving the signal from the processor using the watchdog timer circuit and continuing to monitor the signal;
   determining that the processor has failed to send the signal to the watchdog timer circuit;
   outputting a processor fault signal from the watchdog timer circuit upon determining that the processor has failed to send the signal;
   a relay drive circuit receiving the processor fault signal; and
   disconnecting output power to the output relay when the relay drive circuit receives the processor fault signal.

* * * * *